United States Patent
Hsu et al.

(10) Patent No.: US 8,598,272 B2
(45) Date of Patent: Dec. 3, 2013

(54) COMPATIBILIZER AND BLEND POLYMER COMPOSITION INCLUDING THE SAME

(75) Inventors: Jui-Hsi Hsu, Tainan Hsien (TW); Ming-Chou Kao, Tainan Hsien (TW)

(73) Assignee: Chi Mei Corporation, Tainan Hsien (TW)

( * ) Notice: Subject to any disclaimer, the term of this patent is extended or adjusted under 35 U.S.C. 154(b) by 0 days.

(21) Appl. No.: 12/985,187

(22) Filed: Jan. 5, 2011

(65) Prior Publication Data

US 2012/0010363 A1 Jan. 12, 2012

(30) Foreign Application Priority Data

Jul. 8, 2010 (TW) ................................ 99122505 A

(51) Int. Cl.
*C08L 31/00* (2006.01)
(52) U.S. Cl.
USPC .................. 525/94; 525/93; 525/96; 525/190
(58) Field of Classification Search
USPC ........................................ 525/93, 94, 96, 190
See application file for complete search history.

(56) References Cited

U.S. PATENT DOCUMENTS

2006/0128870 A1* 6/2006 Marx et al. ..................... 524/505
2007/0049696 A1* 3/2007 Gonzalez et al. ............. 525/242

OTHER PUBLICATIONS

Maa, C.T.; Chang, F.C.; Journal of Applied Polymer Science, 1993, p. 913-924.*
Huang, J.M.; Journal of Applied Polymer Science, 2003, p. 2247-2252.*
Fan, D., et al.; Journal of Polymer Science Part A: Polymer Chemistry, 2006, vol. 4, Issue 7, p. 2260-2269.*

* cited by examiner

*Primary Examiner* — Robert Jones, Jr.
(74) *Attorney, Agent, or Firm* — Christie, Parker & Hale, LLP

(57) ABSTRACT

A blend polymer composition includes a styrene-based polymer, a non-styrene-based polymer, and a compatibilizer having a block copolymer. The block copolymer includes: a first block including a first monomer unit having an epoxy group, and a second monomer unit selected from an acrylate-based monomer unit, a methacrylate-based monomer unit, and a combination thereof; and a second block including a styrene-based monomer unit. The block copolymer has an epoxy equivalent ranging from 1000 g/eq to 20000 g/eq and a molecular weight distribution index ranging from 1.0 to 2.0.

13 Claims, 4 Drawing Sheets

US 8,598,272 B2

COMPATIBILIZER AND BLEND POLYMER COMPOSITION INCLUDING THE SAME

CROSS-REFERENCE TO RELATED APPLICATION

This application claims priority of Taiwanese application no. 099122505, filed on Jul. 8, 2010.

BACKGROUND OF THE INVENTION

1. Field of the Invention

This invention relates to a compatibilizer having a block copolymer produced by a living radical polymerization, more particularly to a compatibilizer having a block copolymer that includes an epoxy group, and a blend polymer composition including the compatibilizer.

2. Description of the Related Art

Because the application field of polymer compositions has become increasingly extensive, the required properties of the polymer compositions may differ with respect to different applications. Thus, a variety of novel polymer compositions have been developed. Especially, much attention has been paid to blend polymer compositions, each of which includes different kinds of resins, in recent years since the blend polymer compositions may combine the properties and advantages of the different constituent resins. For example, the blend polymer composition may have reduced cost and a relatively high mechanical strength, or may be biodegradable. Therefore, a blend polymer composition is usually prepared according to a specific purpose.

For example, a pure resin of acrylonitrile-butadiene-styrene (ABS) may be replaced by a blend resin composition of ABS and polymethylmethacrylate (PMMA) to reduce cost. A pure polystyrene (PS) may be replaced by a blended polymer composition of PS and polylactic acid (PLA). Since use of PLA is able to reduce the required amount of petrochemical polymers and discharge of carbon dioxide and since PLA itself is a biodegradable polymer, the blend polymer composition of PS and PLA is more environment-friendly. Besides, polyesters, such as polyethylene terephthalate (PET), etc., are commonly used to produce beverage bottles. If such polyester could be recycled to blend with other polymers to produce a useful forming material, the amount of trash can be reduced and the recycled polyester may also have economical benefits.

Since different polymers have different chemical structures and properties, the blending of different kinds of polymers may have a compatibility problem. Accordingly, development of compatibilizers suitable for the blend polymer compositions has become increasingly important.

For example, when blending a styrene-based polymer with an aliphatic polyester to produce a blend polymer composition, a copolymer including a vinyl-based monomer unit and an epoxy group-containing monomer unit (an unsaturated acid glycidyl ester unit) is added to serve as a compatibilizer (see US patent application publication no. 2010/0160505). However, such conventional compatibilizer is a random copolymer, and not a block copolymer, and is not synthesized by a living radical polymerization. Therefore, the conventional compatibilizer has a wide molecular weight distribution, and the blend polymer compositions produced using the same may not satisfy the actual requirements in terms of mechanical properties.

When blending a styrene-based polymer with a polylactic acid-based polymer to produce a blend polymer composition, a styrene-(meth)acrylate-based block copolymer is added to serve as a compatibilizer. Such compatibilizer includes blocks having an affinity to respective constituent polymers of the blend polymer composition, so as to achieve the required compatible effect. However, there is no chemical bonding among the compatibilizer and the polymers. Therefore, although the blend polymer composition may have enhanced mechanical properties (such as impact strength) by virtue of addition of the compatibilizer, there is plenty of room for improvement in these mechanical properties. On the other hand, such compatibilizer is only useful for the blend polymer composition including the styrene-based polymer and the polylactic acid-based polymer, and thus the application of the same is limited.

SUMMARY OF THE INVENTION

The applicants found that the mechanical properties of the blend polymer composition are correlated to whether the different constituent polymers in the blend polymer composition are well mixed or not. That is to say, the compatibility among the constituent polymers may affect the mechanical strength of the resulting blend polymer composition.

Therefore, an object of the present invention is to provide a blend polymer composition having an improved impact strength. Another object of the present invention is to provide a compatibilizer that can improve the compatibility among different constituent polymers.

According to one aspect of this invention, there is provided a blend polymer composition that comprises:

a styrene-based polymer;

a non-styrene-based polymer; and a compatibilizer having a block copolymer that includes:

a first block including a first monomer unit having an epoxy group and a second monomer unit selected from an acrylate-based monomer unit, a methacrylate-based monomer unit and a combination thereof; and a second block including a styrene-based monomer unit;

wherein the block copolymer has an epoxy equivalent ranging from 1000 g/eq to 20000 g/eq and a molecular weight distribution index ranging from 1.0 to 2.0.

According to another aspect of this invention, there is provided a compatibilizer comprising a block copolymer that includes:

a first block having a first monomer unit that contains an epoxy group and a second monomer unit selected from an acrylate-based monomer unit, a methacrylate-based monomer unit and a combination thereof; and a second block having a styrene-based monomer unit;

wherein the block copolymer has an epoxy equivalent ranging from 1000 g/eq to 20000 g/eq and a molecular weight distribution index ranging from 1.0 to 2.0

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
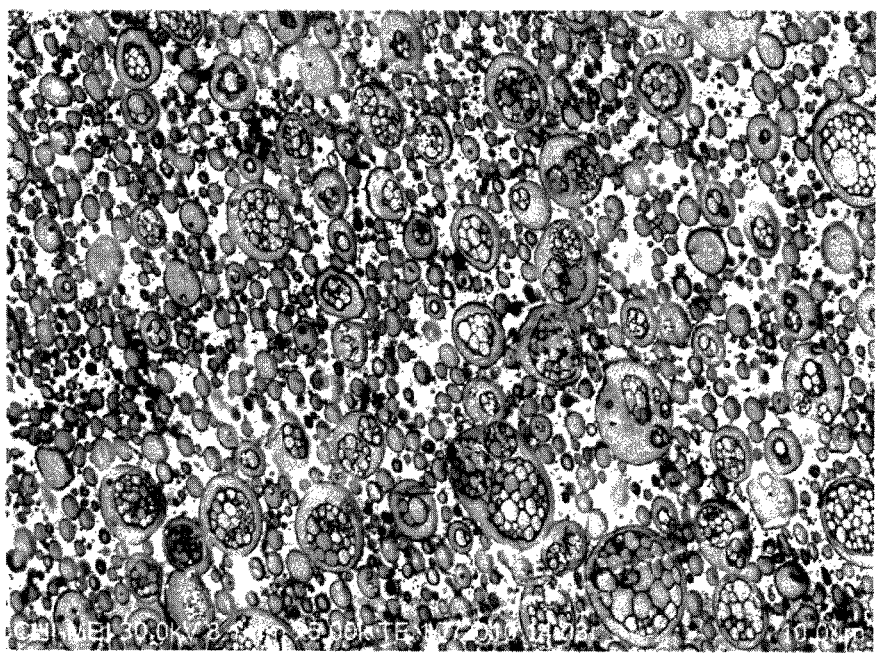
FIG. 1 shows a transmission electron micrograph of a test sample formed using the blend polymer composition of Example 11.

A compatibilizer of this invention comprises a block copolymer that includes first and second blocks. The first block has an epoxy group whereas the second block includes no epoxy group.

The first block includes first and second monomer units. The first monomer unit has the epoxy group, and the second monomer unit includes an acrylate-based monomer unit, a methacrylate-based monomer unit, or a combination thereof. The second block includes a styrene-based monomer unit. The block copolymer has an epoxy equivalent ranging from 1000 g/eq to 20000 g/eq and a molecular weight distribution index ranging from 1.0 to 2.0.

The epoxy equivalent of the block copolymer ranges preferably from 1000 g/eq to 10000 g/eq, more preferably from 2000 g/eq to 10000 g/eq, and most preferably from 2000 g/eq to 6000 g/eq.

The molecular weight distribution index of the block copolymer ranges preferably from 1.0 to 1.8, more preferably from 1.0 to 1.7, and most preferably from 1.0 to 1.6.

The block copolymer has a number average molecular weight ranging preferably from 3000 to 80000, more preferably from 5000 to 50000, and most preferably from 7000 to 25000. The first block has a number average molecular weight ranging preferably from 1000 to 55000, more preferably from 2000 to 35000, and most preferably from 3000 to 15000. When the number average molecular weights of the block copolymer in the compatibilizer and the first block fall within the preferred ranges, a blend polymer composition having the compatibilizer would have better fluidity and workability in addition to the improved compatibility.

Preferably, the first monomer unit, which has the epoxy group, includes an unsaturated carboxylic acid glycidyl ester unit. More preferably, the unsaturated carboxylic acid glycidyl ester unit is glycidyl acrylate (GA) unit, glycidyl methacrylate (GMA) unit, glycidyl ethacrylate unit, glycidyl itaconate unit, or a combination thereof.

The block copolymer of this invention is synthesized by a living radical polymerization.

The acrylate-based monomer unit has no specific limitation except that it includes no epoxy group. Examples of the acrylate-based monomer unit include units of methyl acrylate, ethyl acrylate, n-propyl acrylate, butyl acrylate, n-hexyl acrylate, cyclohexyl acrylate, 2-ethylhexyl acrylate, lauryl acrylate, isobornyl acrylate, cyclododecyl acrylate, chloromethyl acrylate, 2-chloroethyl acrylate, 2-hydroxyethyl acrylate, 3-hydroxypropyl acrylate, 2,3,4,5,6-pentahydroxyhexyl acrylate, 2,3,4,5-tetrahydroxypentyl acrylate, etc. Preferably, the acrylate-based monomer unit is selected from units of methyl acrylate, ethyl acrylate, butyl acrylate. The second monomer unit may include one or more of the above-mentioned acrylate-based monomer units.

The methacrylate-based monomer unit has no specific limitation except that it includes no epoxy group. Examples of the methacrylate-based monomer unit include units of methyl methacrylate (MMA), ethyl methacrylate, n-propyl methacrylate, n-butyl methacrylate, t-butyl methacrylate, n-hexyl methacrylate, cyclohexyl methacrylate, 2-ethylhexyl methacrylate, lauryl methacrylate, isobornyl methacrylate, cyclododecyl methacrylate, chloromethylmethacrylate, 2-chloroethyl methacrylate, 2-hydroxyethyl methacrylate, 3-hydroxypropyl methacrylate, 2,3,4,5,6-pentahydroxyhexyl methacrylate, 2,3,4,5-tetrahydroxypentyl methacrylate, etc. Preferably, the methacrylate-based monomer unit is selected from units of methyl methacrylate, ethyl methacrylate, and n-butyl methacrylate. The second monomer unit may include one or more of the above-mentioned methacrylate-based monomer units.

Alternatively, the first block may further include other monomer units, for example, units of styrene, α-methylstyrene, m-methylstyrene, o-methylstyrene, p-methylstyrene, o-ethylstyrene, p-ethylstyrene, p-t-butylstyrene, acrylonitrile, methacrylonitrile, ethacrylonitrile, vinylacetate, N-methyl maleimide, N-ethyl maleimide, N-cyclohexyl maleimide, N-phenyl maleimide, acrylamide, methacrylamide, N-methyl acrylamide, butoxymethyl acrylamide, and N-propyl methacrylamide. The first block may include one or more of the above-mentioned monomer units. In order to obtain a good compatibilizer, the total weight of the acrylate-based monomer unit plus the methacrylate-based monomer unit is preferably in an amount greater than 30 wt %, more preferably greater than 50 wt %, and most preferably greater than 80 wt %, based on the total weight of the first block.

The styrene-based monomer unit has no specific limitation. Examples of the styrene-based monomer unit include units of styrene, α-methylstyrene, 4-methylstyrene, 2-methylstyrene, 3-methylstyrene, 4-methoxystyrene, p-t-butylstyrene, p-n-butylstyrene, p-tert-butylmethoxystyrene, 2-hydroxymethylstyrene, 2-chlorostyrene, 4-chlorostyrene, 2,4-dichlorostyrene, etc. Preferably, the styrene-based monomer unit is selected from units of styrene and α-methylstyrene.

Alternatively, in addition to the styrene-based monomer unit, the second block may further include other monomer units, for example, units of acrylonitrile, methacrylonitrile, ethacrylonitrile, methyl acrylate, MMA, vinylacetate, N-methyl maleimide, N-ethyl maleimide, N-cyclohexyl maleimide, N-phenyl maleimide, acrylamide, methacrylamide, N-methyl acrylamide, butoxymethyl acrylamide, N-propyl methacrylamide, etc. Preferably, the other monomer units that may be included in the second block are selected from units of acrylonitrile and MMA. The second block may include one or more of the above-mentioned monomer units. In order to obtain a good compatibilizer, when the other monomer units are present in the second block, the styrene-based monomer unit is preferably in an amount greater than 30 wt %, more preferably greater than 50 wt %, and most preferably greater than 80 wt %, based on the total weight of the second block.

The block copolymer of this invention is synthesized by a living radical polymerization that may be a nitroxide-mediated polymerization, an atom transfer radical polymerization, a reversible addition-fragmentation chain transfer polymerization, an organotellurium-mediated living radical polymerization, or a reversible chain transfer catalyzed polymerization.

When synthesizing the block copolymer of this invention, it is preferred to use a polymerization initiator selected from a tellurium-containing compound and an azo-based compound.

The tellurium-containing compound is an organo-tellurium compound represented by the following formula (1), a ditelluride compound represented by the following formula (2), or a combination thereof.

In the formula (1), $R^1$ is $C_1$-$C_8$ alkyl, aryl, substituted aryl, or an aromatic heterocyclic group; $R^2$ and $R^3$ are independently hydrogen or $C_1$-$C_8$ alkyl; and $R^4$ is aryl, substituted aryl, an aromatic heterocyclic group, acyl, oxycarbonyl, or cyano.

Examples of Groups Represented by $R^1$ are Described in More Detail as Follows:

Examples of $C_1$-$C_8$ alkyl group may be linear, branched, or cyclic and include methyl, ethyl, n-propyl, isopropyl, cyclopropyl, n-butyl, sec-butyl, tert-butyl, cyclobutyl, n-pentyl, n-hexyl, n-heptyl, n-octyl, etc. The alkyl group is preferably a linear or branched $C_1$-$C_4$ alkyl group. Methyl, ethyl, or n-butyl is more preferable.

Examples of the aryl group include phenyl, naphthyl, etc. Examples of the substituted aryl group include substituted phenyl, substituted naphthyl, etc. Examples of the aromatic heterocyclic group include pyridyl, pyrrolyl, furyl, thianthrenyl, etc. Examples of the substituent of the substituted aryl group include a halogen atom, hydroxyl, alkoxy, amino, nitro, cyano, a carbonyl-containing group represented by —$COR^5$ ($R^5$ is $C_1$-$C_8$ alkyl, aryl, $C_1$-$C_8$ alkoxy, or aryloxy), sulfonyl, trifluoromethyl, etc. Preferably, aryl groups (including substituted and non-substituted aryl groups) are phenyl and trifluoromethyl phenyl. Preferably, the substituted aryl groups have one or two substituents at para- or ortho-positions.

Examples of Groups Represented by $R^2$ and $R^3$ are Described in More Detail as Follows:

Examples of $C_1$-$C_8$ alkyl group are the same as the alkyl groups represented by $R^1$ and given above.

Examples of Groups Represented by $R^4$ are Described in More Detail as Follows:

Examples of aryl, substituted aryl, and aromatic heterocyclic groups are the same as those groups represented by $R^1$ and given above.

Examples of acyl groups include formyl, acetyl, benzoyl, etc.

Examples of oxycarbonyl groups are represented by —$COOR^6$ ($R^6$ is hydrogen, $C_1$-$C_8$ alkyl or aryl), and include carboxyl, methoxycarbonyl, ethoxycarbonyl, propoxycarbonyl, n-butoxycarbonyl, sec-butoxycarbonyl, tert-butoxycarbonyl, n-pentoxycarbonyl, phenoxycarbonyl, etc. Methoxycarbonyl and ethoxycarbonyl are more preferable oxycarbonyl groups.

Preferably, $R^4$ is aryl, substituted aryl, oxycarbonyl, or cyano, in which: the aryl group is preferably phenyl; and the substituted aryl group is preferably halogen-substituted phenyl or trifluoromethyl phenyl. When the substituent is a halogen atom, the phenyl is preferably substituted with 1 to 5 halogen atoms. When the substituted aryl group is substituted by alkoxy or trifluoromethyl groups, it is preferably substituted with 1 or 2 substituents. If one substituent exists, the group is preferably substituted at para- or ortho-position. If two substitutents exist, the group is preferably substituted at meta-positions.

In the organo-tellurium compound represented by the formula (1), it is preferred that $R^1$ is a $C_1$-$C_4$ alkyl group, that $R^2$ and $R^3$ are independently hydrogen or a $C_1$-$C_4$ alkyl group, and that $R^4$ is an aryl group, a substituted aryl group, or an oxy-carbonyl group. More preferably, $R^1$ is a $C_1$-$C_4$ alkyl group, $R^2$ and $R^3$ are independently hydrogen or a $C_1$-$C_4$ alkyl group, and $R^4$ is phenyl, substituted phenyl, methoxycarbonyl or ethoxycarbonyl.

Examples of the organo-tellurium compound represented by the formula (1) include (methyltellanyl-methyl)benzene, (1-methyltellanyl-ethyl)benzene, (2-methyltellanyl-propyl)benzene, 1-chloro-4-(1-methyltellanyl-ethyl)benzene, 1-trifluoromethyl-4-(1-methyltellanyl-ethyl)benzene, methyl 2-methyltellanyl-2-methylpropionate, ethyl 2-methyltellanyl-2-methylpropionate, [ethyl-2-methyl-2-methyltellanyl-propionate], ethyl 2-(n-butyltellanyl)-2-methylpropionate, [ethyl-2-methyl-2-n-butyltellanyl-propionate], 1-(1-methyltellanyl-ethyl)-3,5-bis-trifluoromethylbenzene, 1,2,3,4,5-pentafluoro-6-(1-methyltellanyl-ethyl)benzene, 2-methyltellanyl-propionitrile, 2-methyl-2-methyltellanyl-propionitrile, (ethyltellanyl-methyl)benzene, (1-ethyltellanyl-ethyl)benzene, (2-ethyltellanyl-propyl)benzene, methyl 2-ethyltellanyl-2-methylpropionate, ethyl 2-ethyltellanyl-2-methylpropionate, 2-ethyltellanyl-propionitrile, 2-methyl-2-ethyltellanylpropionitrile, (n-butyltellanyl-methyl)benzene, (1-n-butyltellanyl-ethyl)benzene, (2-n-butyltellanyl-propyl)benzene, methyl 2-n-butyltellanyl-2-methylpropionate, ethyl 2-n-butyltellanyl-2-methylpropionate, 2-n-butyltellanyl-propionitrile, 2-methyl-2-n-butyltellanyl-propionitrile, etc.

$R^7$ of the ditelluride compound represented by the formula (2) has the same definition as $R^1$ of the organo-tellurium compound represented by the formula (1) and given above.

In the ditelluride compound represented by the formula (2), $R^7$ is preferably $C_1$-$C_4$ alkyl group or phenyl.

Examples of the ditelluride compound represented by the formula (2) include dimethyl ditelluride, diethyl ditelluride, di-n-propyl ditelluride, diisopropyl ditelluride, dicyclopropyl ditelluride, di-n-butyl ditelluride, di-sec-butyl ditelluride, di-tert-butyl ditelluride, dicyclobutyl ditelluride, diphenyl ditelluride, bis(p-methoxyphenyl)ditelluride, bis(p-aminophenyl)ditelluride, bis(p-nitrophenyl)ditelluride, bis(p-cyanophenyl)ditelluride, bis(p-sulfonylphenyl)ditelluride, dinaphthyl ditelluride, dipyridyl ditelluride, etc. Dimethyl ditelluride, diethyl ditelluride, di-n-propyl ditelluride, di-n-butyl ditelluride and diphenyl ditelluride are preferable, and dimethyl ditelluride, diethyl ditelluride, di-n-propyl ditelluride and di-n-butyl ditelluride are more preferable.

In order to accelerate the speed of polymerization, the azo-based compound is preferably added to serve as the polymerization initiator. The azo-based compound is not particularly limited and may be any azo-based compound conventionally used in the radical polymerization. Examples of the azo-based compound include 2,2'-azobis-isobutyronitrile (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovaleric acid) (ACVA), 1,1'-azobis(1-acetoxy-1-phenylethane), 2,2'-azobis(2-methylbutylamide), 2,2'-azobis(4-methoxy-2,4-dimethylvaleronitrile), 2,2'-azobis(2,2,4-trimethylpentane), 2-cyano-2-propylazoformamide, 2,2'-azobis(2-methylpropionamidine)dihydrochloride, 2,2'-azobis[2-(2-imidazolin-2-yl)propane], 2,2'-azobis[2-methyl-N-(2-hydroxyethyl)propionamide], 2,2'-azobis(2,4,4-trimethylpentane), 2,2'-azobis(N-butyl-2-methylpropionamide), 2,2'-azobis(N-cyclohexyl-2-methylpropionamide), etc.

These azo-based compounds are preferably selected depending on the reaction conditions. For example, when the polymerization is conducted at a low temperature (below 40° C.), the azo-based compound is preferably selected from ADVN and 2,2'-azobis(4-methoxy-2,4-dimethylvaleronitrile). When the polymerization is conducted at a moderate temperature (40° C. to 80° C.), the azo-based compound is preferably selected from AIBN, AMBN, MAIB, and 1,1'-azobis(1-acetoxy-1-phenylethane). When the polymerization is conducted at a high temperature (above 80° C.), the azo-based compound is preferably selected from ACHN, 2-cyano-2-propylazoformamide, 2,2'-azobis(N-butyl-2-methylpropionamide), 2,2'-azobis(N-cyclohexyl-2-methylpropionamide), and 2,2'-azobis(2,4,4-trimethylpentane). If the polymerization is performed in an aqueous solvent, the azo-based compound is preferably selected from ACVA, 2,2'-azobis(2-methylbutylamide), 2,2'-azobis(2-methyl propionamidine)dihydrochloride, 2,2'-azobis[2-(2-imidazolin-2-yl)propane], and 2,2'-azobis[2-methyl-N-(2-hydroxyethyl)propionamide]

As to the usage of the organo-tellurium compound represented by the formula (1) and the azo-based compound, the azo-based compound is typically used in the amount of 0.01 mole to 100 moles, preferably 0.05 mole to 100 moles, more preferably 0.1 mole to 10 moles, and most preferably 0.1 mole to 5 moles, per mole of the organo-tellurium compound of the formula (1).

While the polymerization reaction is capable of being conducted in the absence of solvent, an organic solvent conventionally used in the radical polymerization may be used. Examples of the organic solvent suitable for use are benzene, toluene, N,N-dimethylformamide (DMF), dimethyl sulfoxide (DMSO), acetone, chloroform, carbon tetrachloride, tetrahydrofuran (THF), ethyl acetate, trifluoromethylbenzene, etc. Alternatively, aqueous solvents are also suitable, which include, for example, water, methanol, ethanol, isopropanol, n-butanol, ethyl cellosolve, butyl cellosolve, 1-methoxy-2-propanol, etc. The amount of the solvent to be used may be suitably adjusted. For example, 0.01 ml to 100 ml, preferably 0.01 ml to 10 ml, more preferably 0.1 to 1 ml, of the solvent may be used for one gram of the vinyl monomer.

Next, the mixture is stirred. The reaction temperature and the reaction time for the polymerization of the block copolymer may be adjusted suitably in accordance with the molecular weight or molecular weight distribution of the block copolymer of this invention to be obtained. The mixture is stirred usually at 0° C. to 150° C. for 1 minute to 100 hours, preferably at 20° C. to 100° C. for 0.1 hour to 48 hours, and more preferably at 20° C. to 80° C. for 0.1 hour to 24 hours. Thus, a narrow molecular weight distribution (i.e., polydispersity index, PDI) can be efficiently obtained even at a low polymerization temperature and a shorter polymerization time. The reaction is conducted usually under atmospheric pressure, but may be conducted at an increased pressure or at a reduced pressure.

After the completion of the reaction, the solvent used and the remaining unreacted monomers are removed at a reduced pressure to obtain the desired product. The desired product may be isolated by a re-precipitation treatment using a solvent insoluble with the desired product. The re-precipitation treatment can be any method that has no adverse effect on the desired product.

The molecular weight of the block copolymer of this invention may be adjusted in accordance with the reaction time and the amount of the organo-tellurium compound, in which the number average molecular weight preferably ranges from 3000 to 80000, and more preferably from 5000 to 50000.

After the polymerization reaction has finished, the tellurium atom remaining at terminals of the molecule may be removed by: (1) a radical reduction method using tributylstannane or a sulfur-containing compound; (2) an adsorbing method using activated carbon, silica gel, activated alumina, activated clay, molecular sieves, high molecular polymer or the like; (3) a method of absorbing metal using an ion-exchange resin or the like; (4) addition of peroxides such as aqueous hydrogen peroxide, and benzoyl peroxide, while injecting air or oxygen, so that the tellurium atom at the terminal end of the polymer is oxidized and degraded; (5) methods for removing the remaining tellurium atom using water or a suitable solvent such as liquid-liquid extraction method or solid-liquid extraction method, etc. Moreover, these methods may also be combined for removing the remaining tellurium atom.

The blend polymer composition of this invention comprises the following components: a styrene-based polymer, a non-styrene-based polymer, and the above-mentioned compatibilizer.

Preferably, examples of the styrene-based polymer include polystyrene polymer, high impact polystyrene (HIPS) polymer, acrylonitrile-styrene (AS) copolymer, acrylonitrile-butadiene-styrene (ABS) copolymer, methylmethacrylate-butadiene-styrene (MBS) copolymer, methyl methacrylate-acrylonitrile-butadiene-styrene (MABS) copolymer, methyl methacrylate-styrene (MS) copolymer, butadiene-styrene block copolymer, styrene-ethylene-butylene-styrene (SEBS) block copolymer, styrene-isoprene block copolymer, styrene-ethylene-propylene-styrene (SEPS) block copolymer, and combinations thereof.

Preferably, the non-styrene-based polymer is selected from the group consisting of a polymer capable of reacting with an epoxy group, a methacrylate-based polymer, an acrylate-based polymer, and combinations thereof.

The polymer capable of reacting with an epoxy group includes at least one of the following functional groups: a hydroxyl group (—OH), a carboxylic acid group (—COOH), an amino group (—NH$_2$), acid anhydride, an amide group (—CONH$_2$), etc.

Preferably, examples of the polymer capable of reacting with an epoxy group include polylactic acid (PLA), starch polymer, polycarbonate (PC), polyamide (PA), polyethylene terephthalate (PET), polybutylene terephthalate (PBT), thermoplastic polyurethane (TPU), and combinations thereof.

Examples of PLA include poly-L-lactic acid (PLLA), poly-D-lactic acid (PDLA), poly-D, L-lactic acid (PDLLA), etc.

PC may be a bisphenol A-series compound, for example, 2,2-bis-(4-hydroxy phenyl)-propane (bisphenol A), bis-(4-hydroxyphenyl)-methane, 4,4'-dihydroxybiphenyl, 1,1-bis-(4-hydroxyphenyl)-ethane, and 2,2-bis-(3-methyl-4-hydroxyphenyl)-propane. In order to have better reactivity with the epoxy group, terminal hydroxyl groups of PC are preferably in an amount greater than 2 mole %, and more preferably greater than 10 mole % based on the total terminal groups of PC.

Examples of PA include nylon 6, nylon 66, nylon 11, nylon 12, nylon 610, nylon 46, etc.

Preferably, the methacrylate-based polymer is polymethyl methacrylate or methyl methacrylate-methyl acrylate copolymer.

Preferably, the acrylate-based polymer is polymethyl acrylate.

The above components of the blend polymer composition may be produced by any known methods such as bulk polymerization, solution polymerization, bulk-suspension polymerization, suspension polymerization, etc.

The percentage for each component in the blend polymer composition of this invention is not limited and may be adjusted based on the required mechanical properties of the blend polymer composition. However, it should be noted that the block copolymer of the compatibilizer in this invention should have an epoxy equivalent ranging from 1000 g/eq to 20000 g/eq and a molecular weight distribution index ranging from 1.0 to 2.0. Besides, the total weight of the acrylate-based monomer unit plus the methacrylate-based monomer unit is preferably in an amount greater than 30 wt %, more preferably greater than 50 wt %, and most preferably greater than 80 wt % based on the total weight of the first block. The styrene-based monomer unit is preferably in an amount greater than 30 wt %, more preferably greater than 50 wt %, and most preferably greater than 80 wt % based on the total weight of the second block.

The preferred ranges for the epoxy equivalent and the molecular weight distribution index of the block copolymer of this invention have been described above and thus, reiteration of the same is omitted herein. When the epoxy equivalent of the block copolymer is over 20000 g/eq, the amount of the epoxy groups is not enough and the reactions among the components of the blend polymer composition are not effective. When the epoxy equivalent of the block copolymer is less than 1000 g/eq, the amount of the epoxy groups is too much and the block copolymer may self-crosslink. Accordingly, if the epoxy equivalent of the block copolymer is out of the above range, the block copolymer cannot serve as a good compatibilizer. Besides, when the molecular weight distribution index of the block copolymer is greater than 2, the compatibility of the components in the blend polymer composition is not good.

The preferred ranges for the number average molecular weight of the block copolymer and the first block of the block copolymer of this invention have been described above and thus, reiteration of the same is omitted herein.

Preferably, at least one component in the blend polymer composition is produced using a tellurium-containing compound as a polymerization initiator.

More preferably, the block copolymer of this invention is produced using a tellurium-containing compound as a polymerization initiator.

In the blend polymer composition of this invention, the weight ratio of the styrene-based polymer to the non-styrene-based polymer is from 2:98 to 98:2, preferably from 5:95 to 95:5, and more preferably from 15:75 to 75:15.

In the blend polymer composition of this invention, the amount of the block copolymer ranges from 0.1 to 30 parts by weight, preferably from 0.2 to 20 parts by weight, and more preferably from 0.5 to 15 parts by weight, based on 100 parts by weight of the styrene-based polymer plus the non-styrene-based polymer.

The blend polymer composition of this invention is prepared by mixing the styrene-based polymer and the non-styrene-based polymer with the block copolymer. If necessary, other additive(s) may be further added, for example, a lubricant (such as zinc stearate, calcium stearate, or ethylene bis-stearyl amide), a plasticizer (such as mineral oil), an antioxidant (such as phenol- or phosphorous-based antioxidant), a UV absorber, a flame retardant, an antistatic agent, a filler, a coloring agent, a dimethyl silicone oil, etc., as long as the additives do not have an adverse effect on the blend polymer composition of this invention.

The blend polymer composition of this invention may be molded by any method, for example, injection molding, extrusion molding, or press-molding. The blend polymer composition may be molded by an extruder into the form of a sheet, a film or a tube using, for example, an extrusion die of a T-shaped die, which may be non-stretched, uniaxial stretched, or biaxial stretched, and an expansion die.

In the block copolymer of the compatibilizer according to the present invention, the first block would react with the non-styrene based polymer by virtue of the epoxy group of the first block, and the second block would blend with the styrene-based polymer by virtue of the intermolecular interaction. For example, when the non-styrene based polymer is PLA, the OH-group of PLA is bonded to the epoxy group of the first block. When the non-styrene based polymer is PBT, the end terminal (OH-group or COOH group) of the PBT is bonded to the epoxy group of the first block. When the non-styrene based polymer is PA, the end terminal ($NH_2$-group or COOH group) of the PA is bonded to the epoxy group of the first block.

In the following examples, test samples were prepared by extruding the mixture of components of the blend polymer composition followed by injection molding. The temperature of extrusion is based on the components of the blend polymer composition.

EXAMPLES

The present invention is explained in more detail below by way of the following examples. It should be noted that the examples are only for illustration and not for limiting the scope of the present invention.

In the following, the number average molecular weight (Mn) and the molecular weight distribution index (PDI=Mw/Mn) are determined by gel permeation chromatography (GPC) using a liquid chromatography Shimadzu LC-10 (column: Shodex K-804L+K-805L, polystyrene standard: TOSOH TSK Standard)

The epoxy equivalent is calculated by the following equation (p):

$$\text{epoxy equivalent} = 100/\text{epoxy value} \quad (p)$$

where the epoxy value is the mole number of epoxy groups per 100 grams of the block polymer, and is determined by the following steps: (1) dissolving the block copolymer in a mixture solution of acetic acid and toluene having a weight ratio of 1:1, (2) adding tetrabutyl ammonium bromide into the mixture solution so that the concentration of tetrabutyl ammonium bromide in the mixture solution is 0.2 M, followed by (3) potentiometrically titrating using 0.1 M $HClO_4$.

Preparation of the Block Copolymer to Serve as a Compatibilizer

Example 1

The block copolymer of Example 1 was prepared by the following steps:

(1) 6.38 g (50 mmol) of metallic tellurium [available from Aldrich, brand name: Tellurium (−40 mesh)] was suspended in 50 ml of THF, and 34.4 ml of 1.6 M solution of n-butyllithium (55 mmoles, available from Aldrich) in hexane was slowly added dropwise to the suspension at room temperature in 10 minutes. The reaction mixture was stirred until the metallic tellurium disappeared completely (about 20 minutes). To the reaction mixture was added 11.0 g (60 mmoles) of (1-bromoethyl)benzene at room temperature, followed by stirring for 2 hours. After the completion of reaction, the solvent was concentrated in a reduced pressure, followed by reduced pressure distillation to obtain 8.66 g of yellow oil (BuTe—$CH(CH_3)Ph$) (yield rate: 70%).

(2) 0.1 g of AIBN, 0.5 g of BuTe—$CH(CH_3)Ph$ obtained in the step (1), 0.05 g of $(Ph-Te)_2$ (available from Acros, brand name: Diphenyl ditelluride), 1.0 g of GMA, 19.0 g of MMA and 20.0 g of toluene were disposed in a reaction bottle (100 ml) and a first polymerization was carried out at 60° C. under nitrogen for 7 hours to obtain a precursor that has a conversion rate of 100%, a number average molecular weight (Mn) of 19424 and a molecular weight distribution index (PDI) of 1.46.

(3) The precursor obtained in the step (2), 40 g of styrene monomer (SM) and 40 g of toluene were polymerized (second polymerization) at 60° C. for 24 hours.

(4) 40 g of toluene was further added, the temperature was raised to 95° C., followed by further polymerizing for 24 hours to produce a block copolymer.

(5) After the polymerization was finished, 1000 g of n-hexane was added to precipitate the block copolymer, followed by purifying, filtering and drying to obtain a product of the block copolymer that has a conversion rate of 65%, a number average molecular weight (Mn) of 30651, a molecular weight distribution index (PDI) of 1.64 and an epoxy equivalent of 5096 g/eq.

Examples 2 to 10

In these Examples, the block copolymers were prepared following the procedure employed in Example 1 except that the first polymerization in the step (2) of Example 4 was carried out for 24 hours. Moreover, the amounts and types of the reactants used for preparing the block copolymers of Examples 2 to 10 are different and are as listed in Table 1. The molecular weight distribution index (PDI) and the epoxy equivalent of the block copolymer of each of Examples 2 to 10 are listed in Table 3.

TABLE 1

| Step | Reactants (g) | EX 1 | EX 2 | EX 3 | EX 4 | EX 5 | EX 6 | EX 7 | EX 8 | EX 9 | EX 10 |
|---|---|---|---|---|---|---|---|---|---|---|---|
| (2) | AIBN | 0.1 | 0.1 | 0.1 | 0.1 | 0.1 | 0.1 | 0.1 | 0.1 | 0.1 | 0.1 |
|  | BuTe—(CH(CH$_3$)Ph) | 0.5 | 0.5 | 0.5 | 1.0 | 1.0 | 1.0 | 0.5 | 0.5 | 0.5 | 0.5 |
|  | (Ph—Te)$_2$ | 0.05 | 0.05 | 0.05 | 0.2 | 0.05 | 0.05 | 0.2 | 0.05 | 0.05 | 0.05 |
|  | GMA | 1.0 | 1.0 | 1.0 | 3.0 | 1.0 | 1.0 | 1.0 | 1.0 | — | — |
|  | GA | —* | — | — | — | — | — | — | — | 1.0 | 1.0 |
|  | MMA | 19 | 19 | 19 | 17 | 19 | 19 | 19 | 19 | 19 | 19 |
|  | Toluene | 20 | 20 | 20 | 20 | 20 | 20 | 20 | 20 | 20 | 20 |
| (3) | SM | 40 | 20 | 100 | 4 | 320 | 480 | 28 | 14 | 28 | 20 |
|  | AIBN | — | — | — | 0.1 | — | — | — | — | — | — |
|  | AN* | — | — | — | — | — | — | 12 | 6 | 12 | — |
|  | Toluene | 40 | 20 | — | 4 | — | — | 40 | 20 | 40 | 20 |
| (4) | Toluene | 40 | 40 | 100 | 12 | — | — | 40 | 20 | 40 | 40 |
| (5) | n-hexane | 1000 | 1000 | 2000 | 1000 | 2000 | 1000 | 1000 | 1000 | 1000 | 1000 |

*"—" means not added.
*AN stands for acrylonitrile.

Comparative Examples 1 to 4 (CE1 to CE4)

In comparative Examples 1 to 4, the block copolymers were prepared following the procedure employed in Example 1 except that the amounts and types of the reactants used for preparing the block copolymers of Comparative Examples 1 to 4 are different and are as listed in Table 2. The molecular weight distribution index (PDI) and the epoxy equivalent of the block copolymer of each of Comparative Examples 1 to 4 are listed in Table 3. Besides, the polymerization of the step (2) for preparing the block copolymer of each of Comparative Examples 1 and 2 was carried out for 24 hours. In the step (4) for preparing the block copolymer of Comparative Example 3, the polymerization was carried out for 72 hours.

TABLE 2

| Step | Reactants (g) | EX 1 | CE 1 | CE 2 | CE 3 | CE 4 |
|---|---|---|---|---|---|---|
| (2) | AIBN | 0.1 | 0.1 | 0.1 | 0.1 | 0.1 |
|  | BuTe—(CH(CH$_3$)Ph) | 0.5 | 1.0 | 1.0 | 1.0 | 1.0 |
|  | (Ph—Te)$_2$ | 0.05 | 0.2 | 0.2 | 0.05 | 0.05 |
|  | GMA | 1.0 | — | 6.0 | 1.0 | 1.0 |
|  | GA | — | — | — | — | — |
|  | MMA | 19 | 20 | 14 | 19 | 19 |
|  | Toluene | 20 | 20 | 20 | 20 | 20 |
| (3) | SM | 40 | 20 | 4 | 600 | 420 |
|  | AIBN | — | — | 0.1 | — | — |
|  | AN | — | — | — | — | 180 |
|  | Toluene | 40 | 20 | 4 | — | — |
| (4) | Toluene | 40 | 20 | 20 | — | — |
| (5) | n-hexane | 1000 | 1000 | 1000 | 3000 | 3000 |

*"—" means not added.

Comparative Example 5 (CE5)

A copolymer of Comparative Example 5 was prepared by the following steps. 0.2 g of AIBN, 20 g of SM, 1.0 g of GMA, 19.0 g of MMA and 20 g of toluene were disposed in a reaction bottle (100 ml), and polymerization was carried out at 60° C. under nitrogen for 36 hours. Then, 20 g of toluene was further added, the temperature was raised to 95° C., followed by further polymerizing for 36 hours to produce a copolymer. It should be noted that, in the copolymer, segments formed by the monomers (SM, GMA and MMA) are randomly arranged.

After the polymerization has finished, 1000 g of n-hexane was added to precipitate the copolymer, followed by purifying, filtering and drying to obtain a product of the copolymer that has a conversion of 92%, a number average molecular weight (Mn) of 21909, a molecular weight distribution index (PDI) of 2.38 and an epoxy equivalent of 5076 g/eq. The above data are also listed in Table 3.

TABLE 3

| | Content of each reactant (Parts by weight) | | Epoxy equivalent | | Mn of First | Mn of |
|---|---|---|---|---|---|---|
| | First block | Second block | (g/eq) | PDI | block | copolymer |
| EX 1 | GMA/MMA = 5/95 | SM = 100 | 5,096 | 1.64 | 19,424 | 30,651 |
| EX 2 | GMA/MMA = 5/95 | SM = 100 | 3,713 | 1.49 | 19,424 | 24,191 |
| EX 3 | GMA/MMA = 5/95 | SM = 100 | 10,547 | 1.66 | 19,424 | 65,191 |
| EX 4 | GMA/MMA = 15/85 | SM = 100 | 1,022 | 1.33 | 9,021 | 11,051 |
| EX 5 | GMA/MMA = 5/95 | SM = 100 | 14,268 | 1.77 | 9,934 | 14,268 |
| EX 6 | GMA/MMA = 5/95 | SM = 100 | 18,847 | 1.79 | 9,934 | 18,847 |
| EX 7 | GMA/MMA = 5/95 | AN/SM = 30/70 | 5,887 | 1.55 | 19,424 | 41,238 |
| EX 8 | GMA/MMA = 5/95 | AN/SM = 30/70 | 4,010 | 1.51 | 19,424 | 30,291 |
| EX 9 | GA/MMA = 5/95 | AN/SM = 30/70 | 5,117 | 1.58 | 17,448 | 39,381 |
| EX 10 | GA/MMA = 5/95 | SM = 100 | 3,585 | 1.66 | 17,448 | 26,191 |
| CE 1 | MMA = 100 | SM = 100 | — | 1.33 | 9,552 | 21,008 |
| CE 2 | GMA/MMA = 30/70 | SM = 100 | 764 | 1.41 | 10,274 | 15,558 |
| CE 3 | GMA/MMA = 5/95 | SM = 100 | 21,824 | 1.86 | 9,934 | 21,824 |
| CE 4 | GMA/MMA = 5/95 | AN/SM = 30/70 | 24,411 | 1.88 | 9,934 | 24,411 |
| CE 5 | — | — | 5,076 | 2.38 | — | 21,909 |

*The content of each reactant in the first or second block is represented by parts by weight based on 100 parts by the weight of the first or second block of the copolymer.

Comparative Examples 6 to 8 (CE6 to CE8)

In Comparative Examples 6 to 8, the copolymers are commercially available products. The copolymer of Comparative Example 6 is a random copolymer (ARUFON UG-4040 made by Toagosei Co., Ltd.) including styrene monomer units and epoxy group-containing monomer units, and has a weight average molecular weight of 11000 and an epoxy equivalent of 476 g/eq. The copolymer of Comparative Example 7 is a random copolymer (ARUFON UG-4070 made by Toagosei) including styrene monomer units and epoxy group-containing monomer units, and has a weight average molecular weight of 9700 and an epoxy equivalent of 714 g/eq. The copolymer of Comparative Example 8 is a random copolymer available from Johnson polymers (JON-CRYL ADR-4368), and has a weight average molecular weight of 6800, an epoxy equivalent of 285 g/eq, and a molecular weight distribution index (PDI) greater than 3. The copolymers in Comparative Examples 6 to 8 are similar to the compatibilizer disclosed in US patent application publication no. 2010/0160505.

Preparation of the Blend Polymer Composition

Example 11

The blend polymer composition of Example 11 was prepared as follows. 1.5 kg of HIPS (available from Chi Mei Corporation, brand name: PH-55Y), 1.5 kg of PLA (available from Nature Works, brand name: 3001D) and 150 g of the block copolymer of Example 1 were introduced into an extruder (available from IKEDA, brand name: EX-100) to extrude at 190° C. for 10 minutes, followed by extruding and pelletizing using a twin-screw extruder to obtain the blend polymer composition.

The blend polymer composition was then processed by injection molding to form a test sheet having a thickness of ⅛ inch, and impact strength (i.e., Izod value) of the test sheet was measured using a cantilever beam impact tester according to ASTM D256 test standard. The test result is shown in Table 4.

Examples 12 to 14 and Comparative Examples 9 to 17 (CE9 to CE17)

The blend polymer compositions of Examples 12 to 14 and Comparative Examples 9 to 17 were prepared following the procedure employed in Example 11 except that the amounts of the reactants that were used and the extruding temperature are different and are as listed in Table 4.

Similarly, each of the blend polymer compositions of Examples 12 to 14 and Comparative Examples 9 to 17 was then processed to form a test sheet having a thickness of ⅛ inch, followed by measuring the impact strength according to ASTM D256 test standard. The test results are all shown in Table 4.

TABLE 4

| | Content of styrene-based polymer (Parts by weight) | Content of non-styrene based polymer (Parts by weight) | Content of compatibilizer (Parts by weight) | Extruding temp. (° C.) | Izod (kg-cm/cm) |
|---|---|---|---|---|---|
| EX 11 | HIPS (50) | PLA (50) | EX 1 (5) | 190 | 6.8 |
| EX 12 | HIPS (50) | PLA (50) | EX 3 (5) | 190 | 6.7 |
| EX 13 | HIPS (70) | PLA (30) | EX 6 (5) | 190 | 6.5 |

TABLE 4-continued

| | Content of styrene-based polymer (Parts by weight) | Content of non-styrene based polymer (Parts by weight) | Content of compatibilizer (Parts by weight) | Extruding temp. (° C.) | Izod (kg-cm/cm) |
|---|---|---|---|---|---|
| EX 14 | HIPS (70) | PLA (30) | EX 5 (5) | 190 | 6.1 |
| CE 9 | HIPS (50) | PLA (50) | CE 1 (5) | 190 | 2.8 |
| CE 10 | HIPS (50) | PLA (50) | CE 2 (5) | 190 | 2.7 |
| CE 11 | HIPS (70) | PLA (30) | CE 3 (5) | 190 | 3.2 |
| EX 15 | ABS (50) | PLA (50) | EX 7 (5) | 220 | 7.8 |
| EX 16 | ABS (50) | PLA (50) | EX 8 (5) | 220 | 8.0 |
| EX 17 | ABS (70) | PLA (30) | EX 9 (5) | 220 | 11.1 |
| CE 12 | ABS (50) | PLA (50) | CE 7 (5) | 220 | 2.4 |
| CE 13 | ABS (70) | PLA (30) | CE 6 (5) | 220 | 5.3 |
| EX 18 | HIPS (50) | PBT (50) | EX 2 (5) | 220 | 6.6 |
| EX 19 | ABS (70) | PBT (30) | EX 9 (5) | 220 | 10.3 |
| CE 14 | ABS (50) | PBT (50) | CE 5 (5) | 220 | 4.1 |
| CE 15 | ABS (70) | PBT (30) | CE 8 (5) | 220 | 6.3 |
| EX 20 | HIPS (50) | PC (50) | EX 4 (5) | 240 | 13.4 |
| CE 16 | HIPS (50) | PC (50) | CE 4 (5) | 240 | 8.8 |
| EX 21 | HIPS (50) | PA (50) | EX 10 (5) | 220 | 13.5 |
| CE 17 | HIPS (50) | PA (50) | CE 4 (5) | 220 | 5.0 |
| EX 22 | ABS (95) | PLA (5) | EX 7 (0.8) | 220 | 17.5 |
| EX 23 | ABS (80) | PLA (20) | EX 8 (3) | 220 | 10.6 |
| EX 24 | ABS (50) | PLA (50) | EX 9 (8) | 220 | 8.9 |

*The content of each reactant is represented by parts by weight based on 100 parts by the weight of the styrene-based polymer plus the non-styrene based polymer.
*HIPS is available from Chi Mei Corporation, has a brand name of PH-55Y in Examples 11 to 14, 18 and 21, and has a brand name of PH-88S in Example 20.
*ABS is available from Chi Mei Corporation (brand name: PA-757), PBT is available from Toray (brand name: PBT-1200M), PC is available from Chi Mei Corporation (brand name: PC-110), and PA is available from Formosa Chemicals & Fibre Corporation (brand name: 2N).

The results shown in Table 4 are discussed below.

Blend polymer compositions of Examples 11-14 and Comparative Examples 9-11 were prepared using the same styrene-based polymer (HIPS) and the same non-styrene based polymer (PLA). The epoxy equivalents of the compatibilizers (CE1-CE3) used in the Comparative Examples 9-11 are listed in Table 3 and exceed the range (1000~20000 g/eq) required by the present invention. Therefore, the Izod values of Comparative Examples 9-11 are relatively low compared to those of Examples 11-14. Furthermore, the compatibilizer (CE1) contained in Comparative Example 9 does not include an epoxy group and is similar to the conventional styrene-(meth)acrylate-based block copolymer described previously in the background part. Thus, it is apparent that the compatibilizer of this invention that includes an epoxy group can impart to the blend polymer composition a better impact strength than that of the conventional styrene-(meth)acrylate-based block copolymer.

Blend polymer compositions of Examples 15-17, 22-24 and Comparative Examples 12-13 were prepared using the same styrene-based polymer (ABS) and the same non-styrene based polymer (PLA). The epoxy equivalents of the compatibilizers (CE6-CE7) used in the Comparative Examples 12-13 are less than 1000 g/eq (see the paragraph of <Comparative Examples 6 to 8>) and are beneath the range (1000~20000 g/eq) required by the present invention. Therefore, the Izod values of Comparative Examples 12-13 are much lower than those of Examples 15-17 and 22-24.

Blend polymer compositions of the Example 19 and the Comparative Examples 14 and 15 were prepared using the same styrene-based polymer (ABS) and the same non-styrene based polymer (PBT). The molecular weight distribution index (PDI) of each of the compatibilizers (CE5 and CE8) used in the Comparative Examples 14-15 is greater than 2 (see Table 3 and the paragraph of <Comparative Examples 6 to 8>) and excel the range (1.0 to 2.0) required by the present invention. Therefore, the Izod values of Comparative Examples 14-15 are much lower than that of Example 19.

Blend polymer compositions of Examples 20-21 and Comparative Example 16-17 were prepared using the same styrene-based polymer (HIPS) and the same non-styrene based polymer (PC or PA). The epoxy equivalent of the compatibilizers (CE4) used in the Comparative Examples 16-17 are greater than 20000 g/eq (see Table 3) and exceed the range (1000~20000 g/eq) required by the present invention. Therefore, the Izod values of Comparative Examples 16-17 are much lower than those of Examples 20-21.

Moreover, the compatibilizers (CE6-CE8) contained in Comparative Examples 12-13 and 15 are random polymers and are similar to the compatibilizer disclosed in US patent application publication no. 2010/0160505. Thus, from the above results, the compatibilizers of this invention that are block copolymers can provide the blend polymer composition with better impact strength than that of the conventional random copolymer described previously in the background part.

Accordingly, when the epoxy equivalent ranges from 1000 to 20000 g/eq and when the molecular weight distribution index (PDI) ranges from 1.0 to 2.0, the compatibilizer according to this invention can be used to well blend the styrene-based polymer and the non-styrene based polymer, and is not limited for blending only two specific polymers.

[Morphology of the Blend Polymer Composition]

The blend polymer compositions of Examples 11, 15 and Comparative Examples 12, 13 were used for preparing transmission electron microscope (TEM) test samples, the test samples were observed by TEM at a magnification of 5000 times, and the results are respectively shown in FIGS. 1 to 4.

In FIG. 1, the white portions represent PLA material, and both the dark gray portions and the particles have salami structure represent HIPS material. As shown in FIG. 1, each domain of HIPS is relatively small and is well mixed with PLA materials. Accordingly, the compatibility of the components in the blend polymer composition of Example 11 is good.

Figure 2:
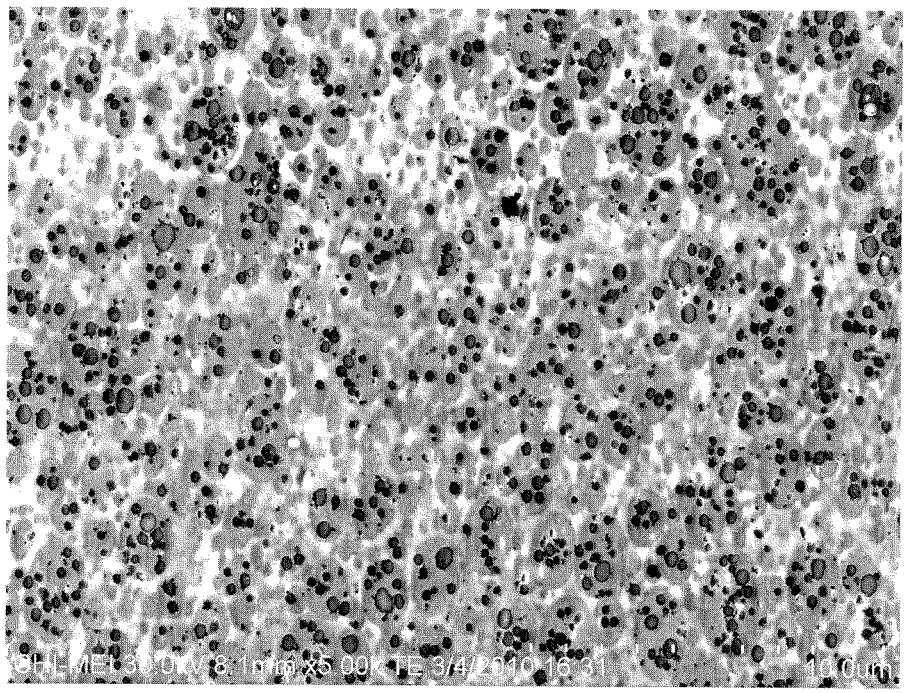
FIG. 2 shows a transmission electron micrograph of a test sample formed using the blend polymer composition of Example 15.
Figure 3:
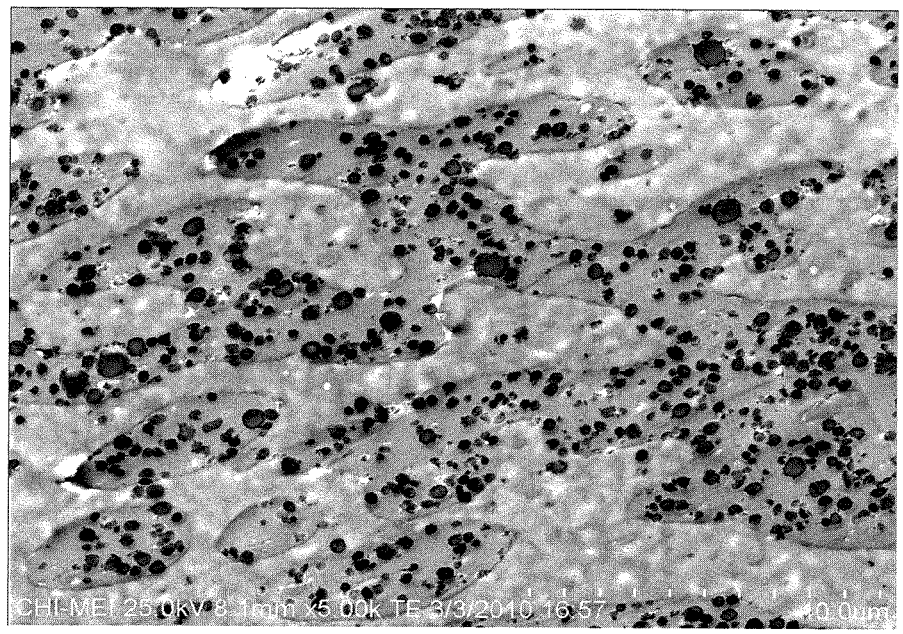
FIG. 3 shows a transmission electron micrograph of a test sample formed using the blend polymer composition of Comparative Example 12.
Figure 4:
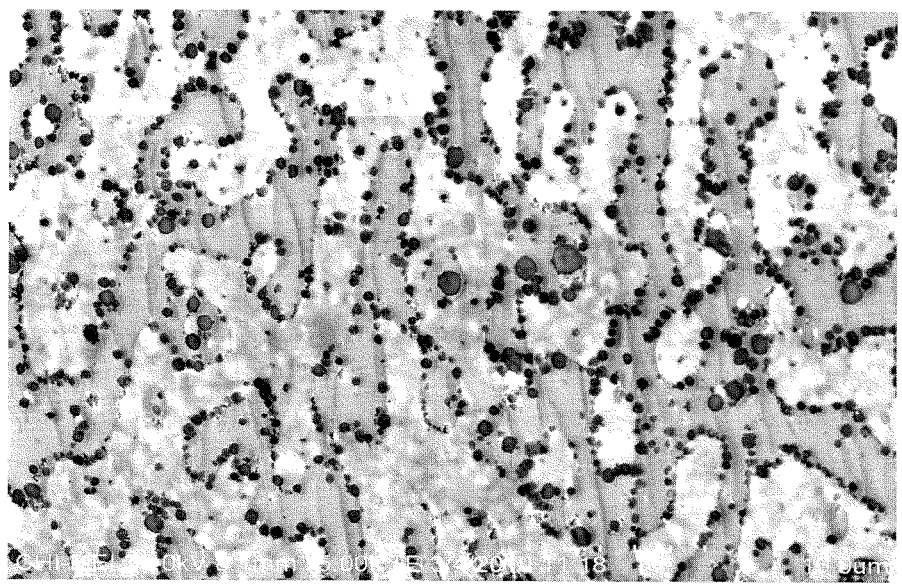
FIG. 4 shows a transmission electron micrograph of a test sample formed using the blend polymer composition of Comparative Example 13.

In FIGS. 2 to 4, the white portions represent PLA material, the black and dark gray portions represent ABS material, and the light gray portions represent AS material. It is apparent that each AS domain of FIG. 2 is smaller than that of FIG. 3 or 4. Accordingly, the compatibility of the components in the blend polymer composition of Example 15 is better than Comparative Examples 12 and 13.

In summary, the block copolymer of the compatibilizer according to this invention is formed by living radical polymerization to have specific epoxy equivalent and molecular weight distribution index. The different components of the blend polymer composition of this invention can be well mixed to have improved compatibility by virtue of the epoxy groups of the block copolymer and can thus have improved mechanical properties.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:
1. A blend polymer composition, comprising:
   a styrene-based polymer;
   a non-styrene-based polymer; and
   a compatibilizer having a block copolymer that consists essentially of:

a first block consisting of a first monomer unit which includes an unsaturated carboxylic acid glycidyl ester unit that has an epoxy group, and a second monomer unit which is free of an epoxy group, and which is selected from the group consisting of an acrylate-based monomer unit, a methacrylate-based monomer unit and a combination thereof; and a second block including a styrene-based monomer unit and an acrylonitrile-based monomer unit;

wherein said block copolymer has an epoxy equivalent ranging from 1000 g/eq to 20000 g/eq and a molecular weight distribution index ranging from 1.0 to 2.0; and wherein said second block is free of an epoxy group.

2. The blend polymer composition of claim 1, wherein said styrene-based monomer unit in said second block is in an amount greater than 50 wt % based on the total weight of said second block.

3. The blend polymer composition of claim 1, wherein said non-styrene-based polymer is selected from a group consisting of a polymer capable of reacting with an epoxy group, a methacrylate-based polymer, an acrylate-based polymer, and combinations thereof.

4. The blend polymer composition of claim 1, wherein said non-styrene-based polymer is selected from the group consisting of polymethyl methacrylate, polymethyl acrylate, methyl methacrylate-methyl acrylate copolymer, polylactic acid, starch polymer, polycarbonate, polyamide, polyethylene terephthalate, polybutylene terephthalate, thermoplastic polyurethane, and combinations thereof.

5. The blend polymer composition of claim 1, wherein the epoxy equivalent of said block copolymer ranges from 1000 g/eq to 10000 g/eq.

6. The blend polymer composition of claim 1, wherein said block copolymer has a number average molecular weight ranging from 3000 to 80000, and said first block has a number average molecular weight ranging from 1000 to 55000.

7. The blend polymer composition of claim 1, wherein the molecular weight distribution index of said block copolymer ranges from 1.0 to 1.8.

8. The blend polymer composition of claim 1, wherein said second monomer unit is in an amount greater than 80 wt % based on the total weight of the first block.

9. The blend polymer composition of claim 1, wherein said unsaturated carboxylic acid glycidyl ester unit is selected from a group consisting of glycidyl acrylate unit, glycidyl methacrylate unit, glycidyl ethacrylate unit, glycidyl itaconate unit, and combinations thereof.

10. The blend polymer composition of claim 1, wherein said block copolymer is synthesized using a tellurium-containing compound to serve as an initiator.

11. The blend polymer composition of claim 1, wherein the weight ratio of said styrene-based polymer to said non-styrene-based polymer is from 2:98 to 98:2.

12. The blend polymer composition of claim 1, wherein the amount of said block copolymer ranges from 0.1 part to 30 parts by weight, based on 100 parts by weight of said styrene-based polymer plus said non-styrene-based polymer.

13. The blend polymer composition of claim 1, wherein said block copolymer has a number average molecular weight ranging from 30291 to 41238.

* * * * *